(12) United States Patent
Spicer

(10) Patent No.: US 8,678,353 B2
(45) Date of Patent: Mar. 25, 2014

(54) FLUID INLET AND DISTRIBUTION SYSTEM FOR VOLATILE ORGANIC COMPOUND REMOVAL DEVICE

(75) Inventor: Bryan D. Spicer, Monroe, MI (US)

(73) Assignee: Graco Minnesota Inc., Minneapolis, MN (US)

( * ) Notice: Subject to any disclaimer, the term of this patent is extended or adjusted under 35 U.S.C. 154(b) by 662 days.

(21) Appl. No.: 13/009,181

(22) Filed: Jan. 19, 2011

(65) Prior Publication Data

US 2012/0181713 A1    Jul. 19, 2012

(51) Int. Cl.
*B01F 3/04*         (2006.01)

(52) U.S. Cl.
USPC ............. 261/23.1; 261/110; 261/114.1

(58) Field of Classification Search
USPC .............. 261/23.1, 110, 113, 114.1, 114.5
See application file for complete search history.

(56) References Cited

U.S. PATENT DOCUMENTS

| | | | |
|---|---|---|---|
| 2,791,408 A | 5/1957 | Lewis | |
| 2,939,771 A | 6/1960 | McDonald et al. | |
| 3,273,872 A * | 9/1966 | Eckert | 261/96 |
| 3,363,843 A * | 1/1968 | Ballard et al. | 239/504 |
| 3,592,612 A * | 7/1971 | Ballard et al. | 422/605 |
| 4,174,363 A | 11/1979 | Bruckert | |
| 4,659,345 A * | 4/1987 | Mojonnier | 96/158 |
| 5,232,283 A * | 8/1993 | Goebel et al. | 366/336 |
| 5,240,595 A | 8/1993 | Lamarre | |
| 5,352,276 A * | 10/1994 | Rentschler et al. | 95/246 |
| 5,378,267 A | 1/1995 | Bros et al. | |
| 5,478,507 A | 12/1995 | Bros | |
| 5,518,668 A | 5/1996 | Chresand et al. | |
| 7,276,215 B2 * | 10/2007 | Muller | 422/224 |
| 8,523,152 B2 * | 9/2013 | Spicer | 261/113 |

* cited by examiner

*Primary Examiner* — Charles Bushey
(74) *Attorney, Agent, or Firm* — Harness, Dickey & Pierce, P.L.C.

(57) ABSTRACT

A fluid inlet and distribution system for a volatile organic removal device includes a cabinet having an upper wall and multiple downcomer assemblies positioned within the cabinet accessible through a cabinet access. The multiple downcomer assemblies are divisible into first and second cabinet compartments isolated from each other by a dividing wall. A flow distribution duct assembly connected to the upper wall of the cabinet includes upper, bottom, outward facing and inward facing substantially flat containment walls defining a generally rectangular shaped flow passage. A contaminated fluid inlet is connected to one of the upper, inward facing, or outward facing containment walls. A discharge duct connected to the bottom containment wall is positioned above a receiving chamber operating to equally divide a flow of a contaminated fluid containing a volatile organic compound discharged through the discharge duct equally to the first and second cabinet compartments.

20 Claims, 6 Drawing Sheets

FLUID INLET AND DISTRIBUTION SYSTEM FOR VOLATILE ORGANIC COMPOUND REMOVAL DEVICE

FIELD

The present disclosure relates to flow distribution systems for volatile organic compound removal devices.

BACKGROUND

This section provides background information related to the present disclosure which is not necessarily prior art.

Groundwater and waste streams can be contaminated with volatile organic compounds (VOCs) which require removal in order to reuse or discharge the water. Air strippers which direct streams of air into a flowing stream of the contaminated water are used to transfer the VOCs from the water (aqueous phase) to the air stream (gaseous phase) which permits removal of the VOCs. Known air strippers include tower designs and stacked designs.

Known stack designs provide for a cascading downward flow of the contaminated water having multiple interior compartments contained within a sealed cabinet. The contaminated water is typically pumped to a receiving manifold of a flow distribution piping assembly consisting of multiple elbows, couplings, flanged/gasket joints, and using multiple threaded fasteners and nuts to construct. The flow distribution piping assembly is normally assembled and entirely supported on an upper wall of the cabinet and extends an upper space envelope of the cabinet significantly. Additional distribution headers and piping connections must be incorporated within the cabinet to distribute the contaminated water to the multiple interior compartments. Known flow distribution piping assemblies are therefore expensive and time consuming to build, and time consuming to disassemble for system maintenance and/or cleaning.

SUMMARY

This section provides a general summary of the disclosure, and is not a comprehensive disclosure of its full scope or all of its features.

According to several embodiments, a fluid inlet and distribution system for a volatile organic removal device includes a cabinet having a horizontal upper wall and a plurality of downcomer assemblies positioned within the cabinet. A flow distribution duct assembly connected to the upper wall of the cabinet includes multiple containment walls defining a flow passage; a contaminated fluid inlet connected to one of the containment walls; and a discharge duct connected to a bottom one of the containment walls and positioned proximate to the plurality of downcomer assemblies. The contaminated fluid inlet directs flow of a contaminated fluid having a volatile organic compound into the flow distribution duct for substantially horizontal-only flow to the at least one discharge duct.

According to further embodiments, a fluid inlet and distribution system for a volatile organic removal device includes a cabinet having an upper wall and multiple downcomer assemblies positioned within the cabinet accessible through a cabinet access. Each of the downcomer assemblies is positioned in individual cabinet compartments each isolated from successive ones of the cabinet compartments by a dividing wall. A flow distribution duct assembly connected to the upper wall of the cabinet includes upper, bottom, outward facing and inward facing containment walls defining a generally rectangular shaped flow passage. A contaminated fluid inlet is connected to one of the upper, inward facing, or outward facing containment walls. A discharge duct connected to the bottom containment wall and positioned above a receiving chamber operates to equally divide a flow of a contaminated fluid containing a volatile organic compound discharged through the discharge duct equally to the cabinet compartments.

According to additional embodiments, a fluid inlet and distribution system for a volatile organic removal device includes a cabinet having an upper wall and multiple downcomer assemblies positioned within the cabinet accessible through each of a cabinet front and rear access. The multiple downcomer assemblies are divisible into first and second cabinet compartments isolated from each other by a dividing wall. The first and second cabinet compartments are duplicated in each of a front portion and a rear portion of the cabinet. A flow distribution duct assembly connected to the upper wall of the cabinet includes mirror image first and second main flow ducts each having upper, bottom, outward facing and inward facing substantially flat containment walls formed into a rectangular shaped flow passage. A contaminated fluid inlet is connected to one of the upper, inward facing, or outward facing containment walls. First and second discharge ducts are each connected to the bottom containment wall of one of the first or second main flow ducts, each positioned above a receiving chamber of one of the front and rear portions, and each operating to equally divide a flow of a contaminated fluid containing a volatile organic compound discharged equally through the first and second discharge ducts to the first and second cabinet portions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
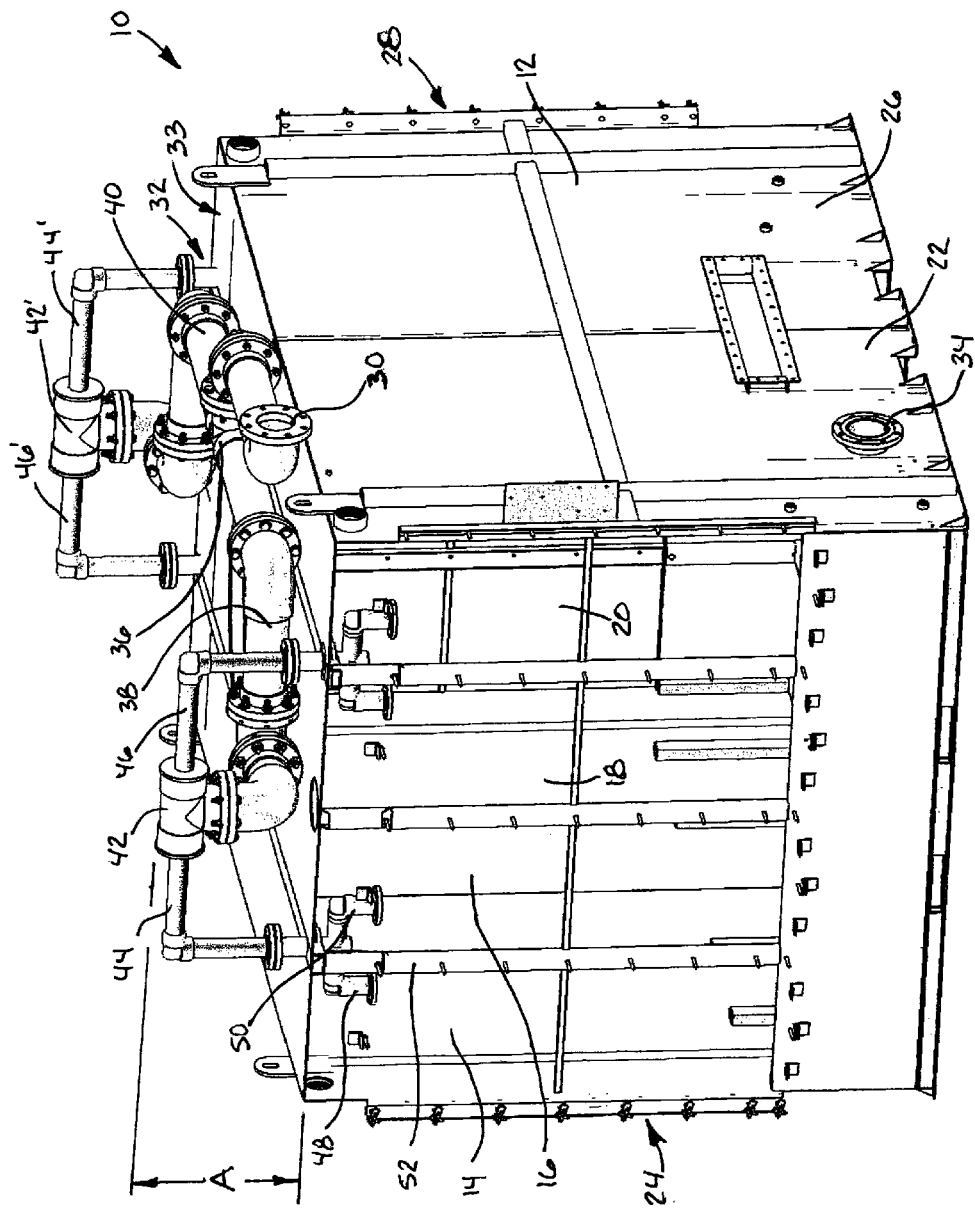
FIG. 1 is a top right perspective view of a volatile organic compound removal device known in the art.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, a volatile organic compound removal device 10 known in the art includes a cabinet 12 having first, second, third and fourth compartments 14, 16, 18, 20 located in a front portion 22 of cabinet 12 which are accessible via a front access 24. A rear portion 26 of cabinet 12 which is accessible via a rear access 28 contains a substantially mirror image configuration of front portion 22 and will therefore not be further discussed. A flow of a fluid contaminated with one or more volatile organic compounds (VOCs) enters cabinet 12 at a contaminated fluid inlet 30 to be distributed equally to the front and rear portions 22, 26 using a flow distribution piping assembly 32 which is mounted to an upper cabinet wall 33 of cabinet 12. After removal of the VOCs from the incoming contaminated fluid, clean and/or purified fluid is discharged from cabinet 12 from a clean fluid discharge port 34.

The incoming flow received through contaminated fluid inlet 30 is initially divided in flow distribution piping assembly 32 by a first tee 36 which directs flow into each of first and second header portions 38, 40. First and second header portions 38, 40 are substantially identical to each other; therefore, the following discussion of first header portion 38 applies equally to second header portion 40. A second tee 42 equally divides half the total contaminated fluid flow received in first header portion 38 into identical first and second cabinet section headers 44, 46. The exemplary flow path of first cabinet header 44 provides contaminated fluid flow to each of first and second compartments 14, 16 via first and second compartment headers 48, 50. First and second compartments 14, 16 are fluid sealed from each other by a compartment dividing wall 52. Flow distribution piping assembly 32 as shown requires greater than 60 fittings/fitting joints, 24 or more gaskets, and more than 136 fastener assemblies each including a threaded fastener and a nut. Individual pipes must also be measured, cut and attached such as by brazing, welding or adhesive bonding to the various fittings. A space envelope "A" above upper cabinet wall 33 is required to install the components of flow distribution piping assembly 32.

Referring to FIG. 2 and again to FIG. 1, a volatile organic compound removal device 100 of the present disclosure includes a cabinet 102 having first, second, third and fourth compartments 104, 106, 108, 110 modified from first, second, third and fourth compartments 14, 16, 18, 20 of volatile organic compound removal device 10. First, second, third and fourth compartments 104, 106, 108, 110 are located in a front portion 111 of cabinet 102 and are accessible via a front access 112. Doors that are closed to seal first, second, third and fourth compartments 104, 106, 108, 110 at front access 112 are removed for clarity, but are shown and described in further detail in reference to FIG. 6. A rear portion 113 of cabinet 102 which is accessible via a rear access 114 provides a substantially mirror image configuration of front portion 111 and will therefore not be further discussed. A flow of a fluid such as water contaminated with one or more volatile organic compounds (VOCs) enters cabinet 102 at a contaminated fluid inlet 116 to be distributed equally to the front and rear portions 111, 113 using a fluid inlet and distribution system 117 which includes a flow distribution duct assembly 118 directly mounted to an upper cabinet wall 120 of cabinet 102. After removal of the VOCs from the incoming contaminated fluid, clean fluid (water containing VOCs measuring from a zero VOC content up to a maximum allowable VOC value) is discharged from cabinet 102 through a clean fluid discharge port 121.

Flow distribution duct assembly 118 replaces the flow distribution piping assembly 32 of known systems and with the exception of a flange 122 at contaminated fluid inlet 116 that eliminates substantially all the standard piping system components such as pipes, elbows, couplings, flanges, gaskets, and threaded fasteners. Flow distribution duct assembly 118 can be pressurized to a limited pressure of the incoming flow of contaminated water, and therefore can distribute flow equally throughout the compartments of cabinet 102 without requiring downwardly pitching any portions of flow distribution duct assembly 118 to rely on gravity flow. Flow distribution duct assembly 118 includes mirror image first and second main flow ducts 123, 124 that equally divide the contaminated water flow received via contaminated fluid inlet 116. Because flow distribution duct assembly 118 is oriented horizontally and provides no upward or downward flow paths within the duct assembly, fluid flow is oriented substantially horizontal-only until downwardly discharged into the cabinet 102.

Because second main flow duct 124 is substantially identical to and a mirror image of first main flow duct 123, and the configuration of rear portion 113 is substantially identical to and a mirror image of front portion 111, the following discussion of first main flow duct 123 and front portion 111 and the components accessible via front access 112 is equally applicable to second main flow duct 124 and rear portion 113. Contaminated water flows only in a substantially horizontal path in first main flow duct 123 until it is downwardly discharged into cabinet 102 through a discharge duct 126 to enter a receiving chamber 128. Receiving chamber 128 is partially bounded on opposite sides by first and second receiving chamber dividing walls 130, 132. From receiving chamber 128, contaminated water flow is equally split around first receiving chamber dividing wall 130 to each of first and second compartments 104, 106 and around second receiving chamber dividing wall 132 to third and fourth compartments 108, 110. The first and second receiving chamber dividing walls 130, 132 extend vertically completely between the upper cabinet wall 120 and a receiving chamber lower wall 133.

The following discussion of flow into first and second compartments 104, 106 applies equally to a mirror image arrangement and flow into third and fourth compartments 108, 110. After passing around first receiving chamber dividing wall 130, contaminated water encounters a chamber dividing wall 134 which permits approximately half of the flow passing first receiving chamber dividing wall 130 to back up sufficiently to overflow a first inner compartment wall portion 136 and fall downwardly into a first downcomer assembly 138 and into second compartment 106. The second half of the flow passing first receiving chamber dividing wall 130 flows over chamber dividing wall 134 into an L-shaped passage 140, overflows an L-shaped second inner compartment wall portion 142, and falls downwardly into a second downcomer assembly 144 and into first compartment 104. To separate the VOCs from the contaminated water stream, a fresh air stream is injected through an air inlet port 146 of cabinet 102. This air stream moves generally upward in an air flow direction "B" through multiple apertures in the plates supporting the downcomer assemblies to separate the VOCs from flowing contaminated water, entrains the VOCs from the contaminated water in gaseous form with the air stream, and the air stream with the gaseous VOCs together exit cabinet 102 through a contaminated air discharge port 148.

Figure 3:
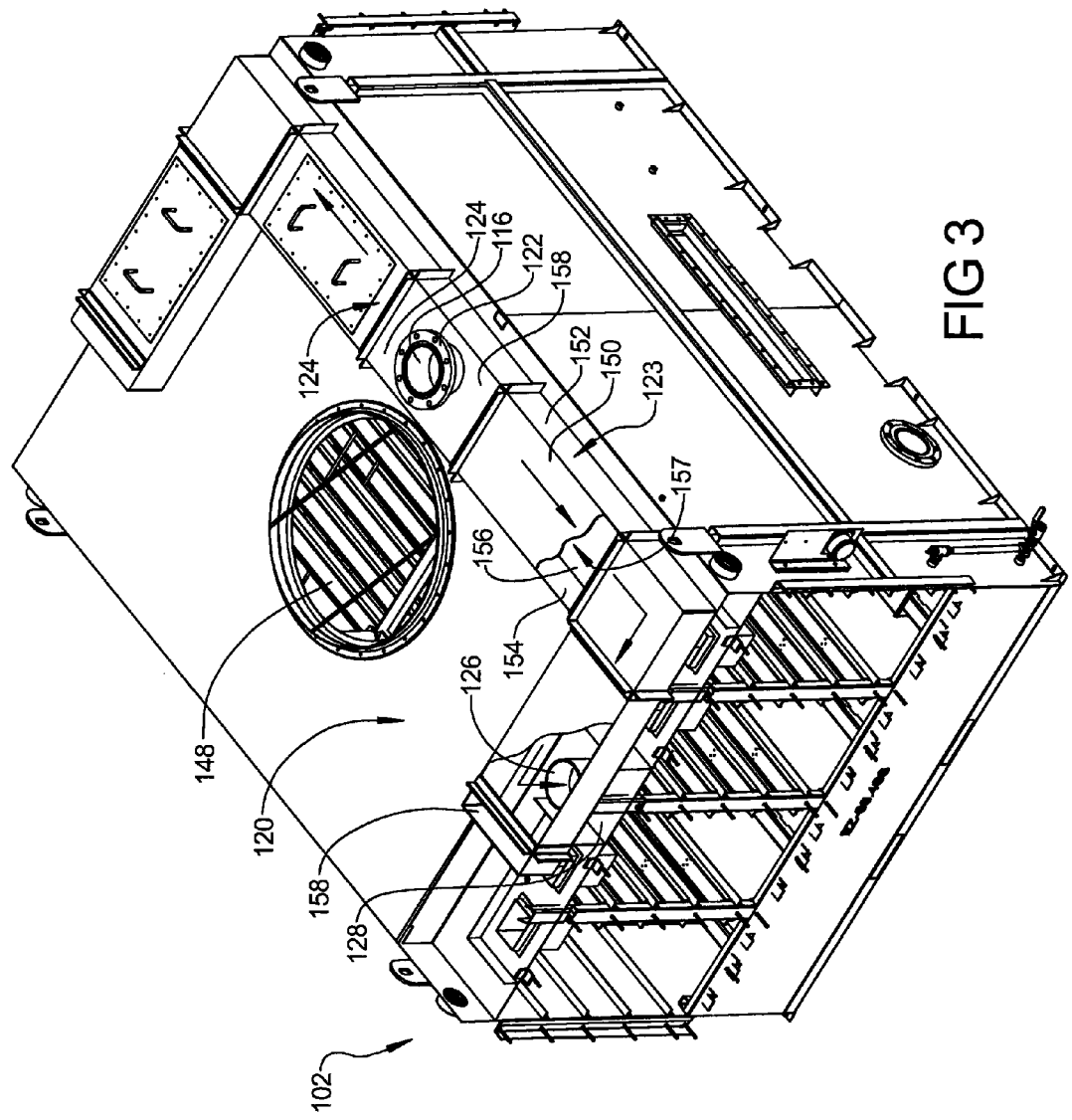
FIG. 3 is a partial cross sectional top right perspective view similar to FIG. 2.

Referring to FIG. 3, a portion of flow distribution duct assembly 118 has been removed for clarity. Approximately half the contaminated water entering contaminated fluid inlet 116 is directed by the flow arrows shown through flow distribution duct assembly 118 and is downwardly discharged through discharge duct 126 into receiving chamber 128. Each of first and second main flow ducts 123, 124 of flow distribution duct assembly 118 are similarly constructed in mirror image form and include an upper containment wall 150, an outward facing containment wall 152, an inward facing containment wall 154, and a bottom containment wall 156. Each of first and second main flow ducts 123, 124 can be formed by bending sheet metal made of steel, stainless steel, aluminum, or the like to create the bottom containment wall 156, the outward and inward facing containment walls 152, 154 and the upper containment wall 150, thereby creating a generally rectangular-shaped flow passage 157 which can be sealed by subsequently creating at least one sealing joint 158. Sealing joints 158 can be made for example by welding or brazing, or by formation of a sheet metal locking joint known in the art. Sealing joints 158 can also be created as flanged joints and can include gaskets between the flanges creating fluid seals.

The first and second main flow ducts 123, 124 are mounted directly to the upper cabinet wall 120 of cabinet 102 by fastening or welding. The bottom containment wall 156 of the rectangular-shaped flow passage 157 extending through first and second main flow ducts 123, 124 therefore conforms to the planar orientation of the upper cabinet wall 120. Rectangular-shaped flow passage 157 is therefore oriented substantially horizontal and does not rely on angular or downward pitch to create gravity flow of the contaminated water toward discharge duct 126. Construction and installation of first and second main flow ducts 123, 124 is thereby simplified and construction techniques used to create air flow ducting can be used. Flanged/gasket connections, sheet metal formed joints, or welded joints can be used to join flange 122 to upper containment wall 150 and to join discharge duct 126 to bottom containment wall 156.

Figure 2:
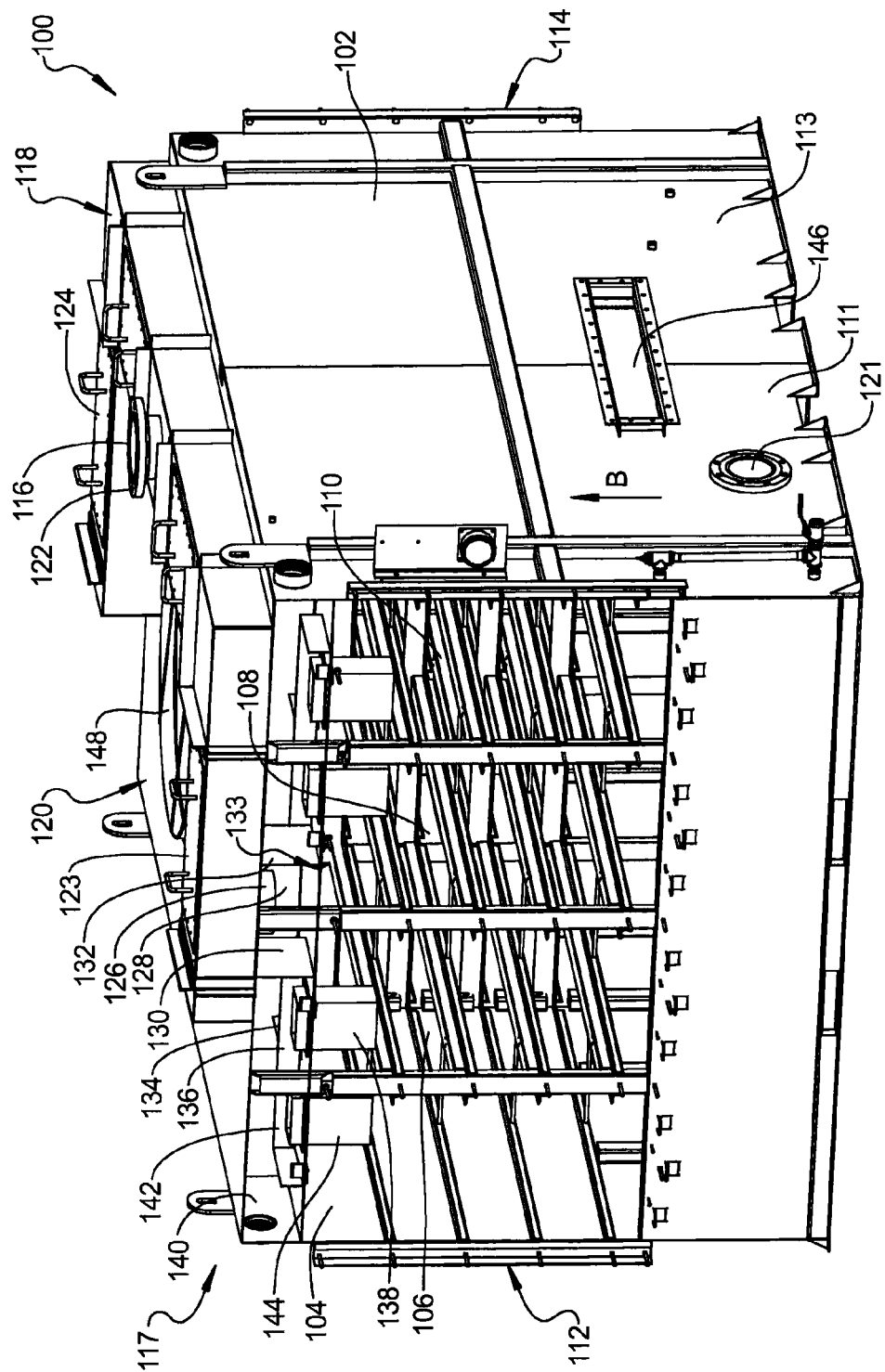
FIG. 2 is a top right perspective view of a volatile organic compound removal device having fluid inlet and distribution channels of the present disclosure in a partially assembled condition.
Figure 4:
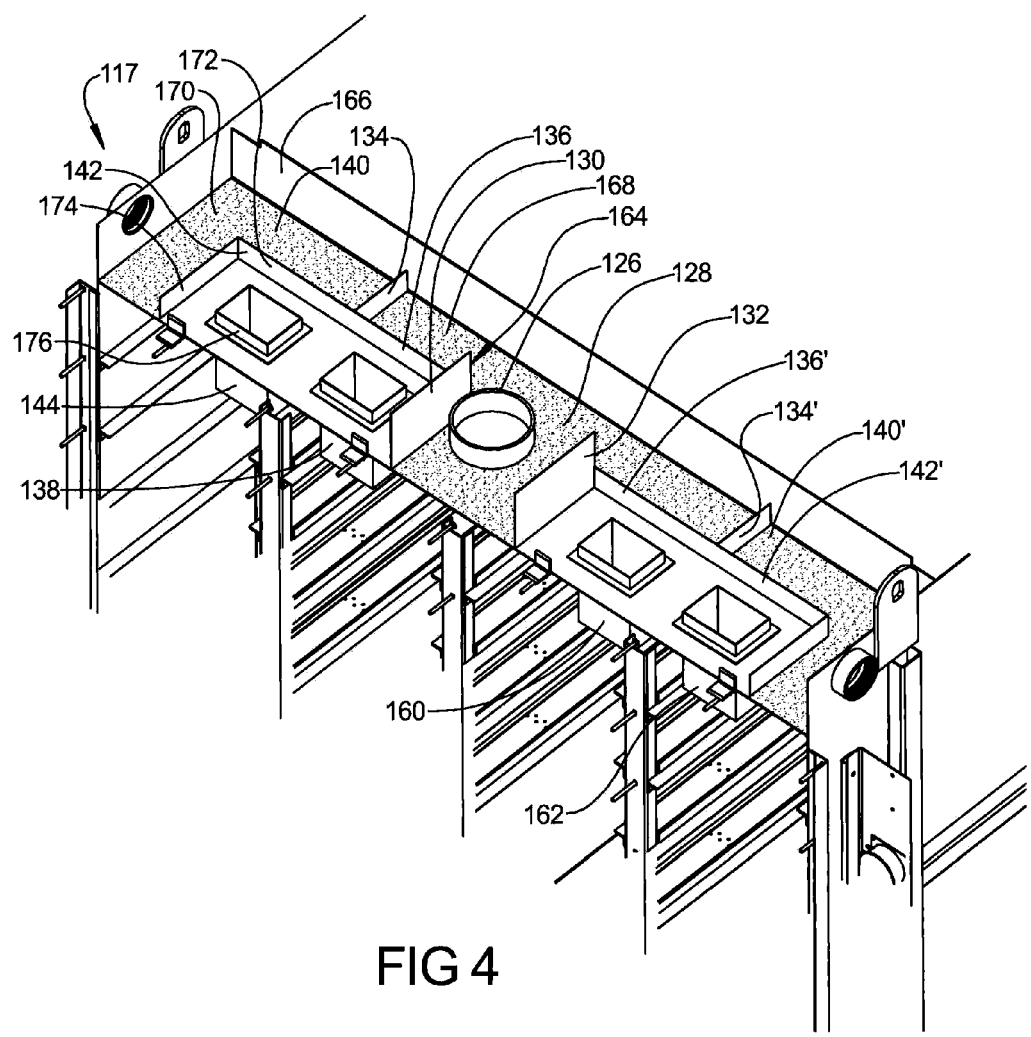
FIG. 4 is a partial cross sectional top right perspective view of area 4 of FIG. 3.

Referring to FIG. 4 and again to FIG. 2, fluid inlet and distribution system 117 additionally provides multiple flow paths which are created to equalize the volume of contaminated water flowing out of receiving chamber 128 and toward each of the downcomer assemblies. In the exemplary embodiment of FIG. 4, first, second, third and fourth downcomer assemblies 138, 144, 160, 162 are provided in the front portion 111 of cabinet 102, and an equal quantity (not shown for clarity) are provided in the rear portion 113 of cabinet 102. From receiving chamber 128, contaminated water is directed between an end face 164 of first receiving chamber dividing wall 130 and a boundary wall 166 and flows over a perforated plate 168 positioned between first receiving chamber dividing wall 130 and chamber dividing wall 134. A first portion of this flow overflows first inner compartment wall portion 136 to enter first downcomer assembly 138. A second portion of the flow overflows chamber dividing wall 134 into L-shaped passage 140, over a perforated plate 170, and then overflows L-shaped second inner compartment wall portion 142 to enter second downcomer assembly 144.

First inner compartment wall portion 136 is a substantially straight length of metal plate connected at a first end to first receiving chamber dividing wall 130 and integrally joining L-shaped second inner compartment wall portion 142. L-shaped second inner compartment wall portion 142 includes a first leg 172 oriented parallel to boundary wall 166, and a second leg 174 oriented perpendicular to first leg 172. Each of the downcomer assemblies including first, second, third and fourth downcomer assemblies 138, 144, 160, 162 are identical to each other and include a vertically extending rectangular shaped perimeter wall 176 that extends above the corresponding perforated surface, such as perforated plate 170. A height of each perimeter wall 176 can be less than or equal to a height of the first or second inner compartment wall portions 136, 142.

Third and fourth downcomer assemblies 160, 162 are arranged as mirror images of first and second downcomer assemblies 138, 144. A configuration of first inner compartment wall portion 136', L-shaped passage 140', and L-shaped second inner compartment wall portion 142' are therefore substantially identical to first inner compartment wall portion 136, L-shaped passage 140, and L-shaped second inner compartment wall portion 142 previously described above.

Figure 5:
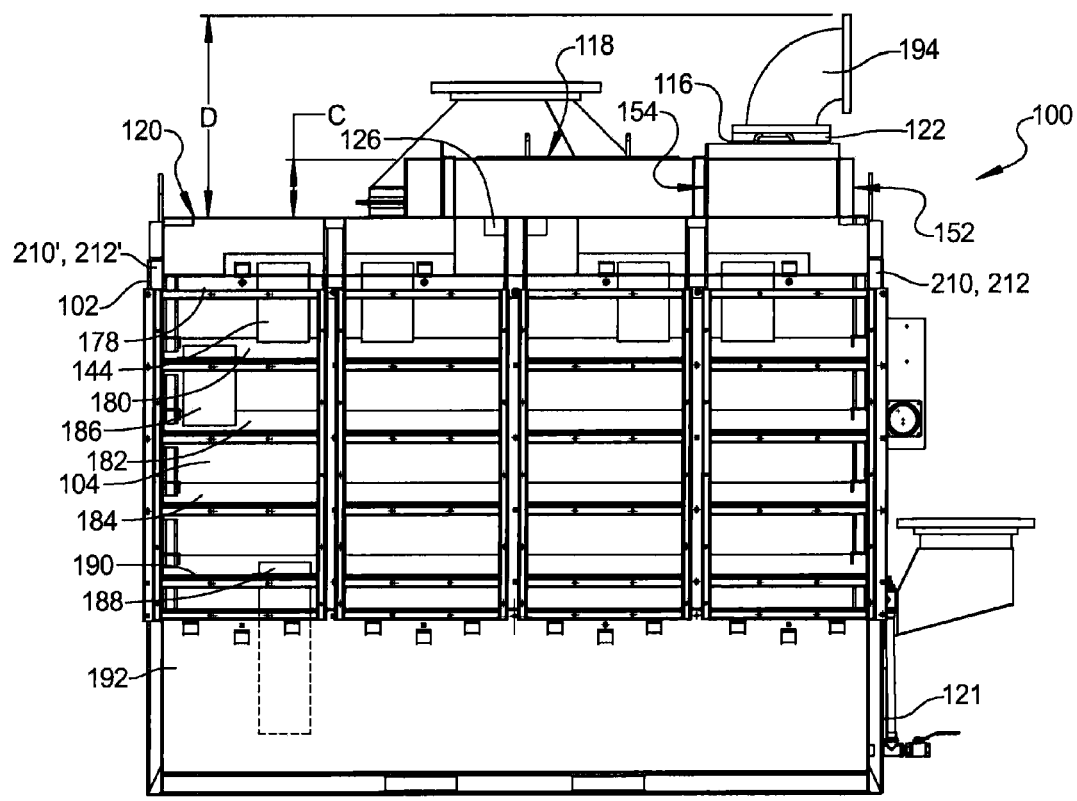
FIG. 5 is a front elevational view of the VOC removal device of FIG. 2.

Referring to FIG. 5, volatile organic compound removal devices of the present disclosure can include multiple sliding drawers in each compartment that individually support a downcomer assembly. In the exemplary embodiment of volatile organic compound removal device 100, first compartment 104 includes a first sliding drawer 178 that supports second downcomer assembly 144. Second, third and fourth sliding drawers 180, 182 and 184 also each support a separate downcomer assembly. The downcomer assembly of each sliding drawer is staggered with respect to the downcomer assembly of the immediately above sliding drawer. For example, a fifth downcomer assembly 186 is staggered with respect to second downcomer assembly 144. A lowest downcomer assembly 188 supported on a surface 190 can have a greater height or length than the other downcomer assemblies for downcomer extension into a sump or chamber 192 that temporarily receives clean water received from the various downcomer assemblies before being pumped out of volatile organic compound removal device 10 via clean fluid discharge port 121.

With continuing reference to FIG. 5 and again to FIG. 2, flow distribution duct assembly 118 occupies a vertical height "C" above upper cabinet wall 120 which is less than the vertical height "A" occupied by flow distribution piping assembly 32. A duct assembly overall vertical height "D" including a flanged elbow 194 connected to a flange 122 at contaminated fluid inlet 116 is also less than vertical height "A". To further reduce the duct assembly overall vertical height "D", flanged elbow 194 can be eliminated and the contaminated fluid inlet 116 can be connected to either the outward or inward facing containment wall 152, 154 in lieu of to upper cabinet wall 120. Cabinet cleanout ports 210, 210', 212, 212' (only cleanout ports 210, 210' are visible in this view) are provided on opposite walls and are shown in greater perspective detail in reference to FIG. 6.

Figure 6:
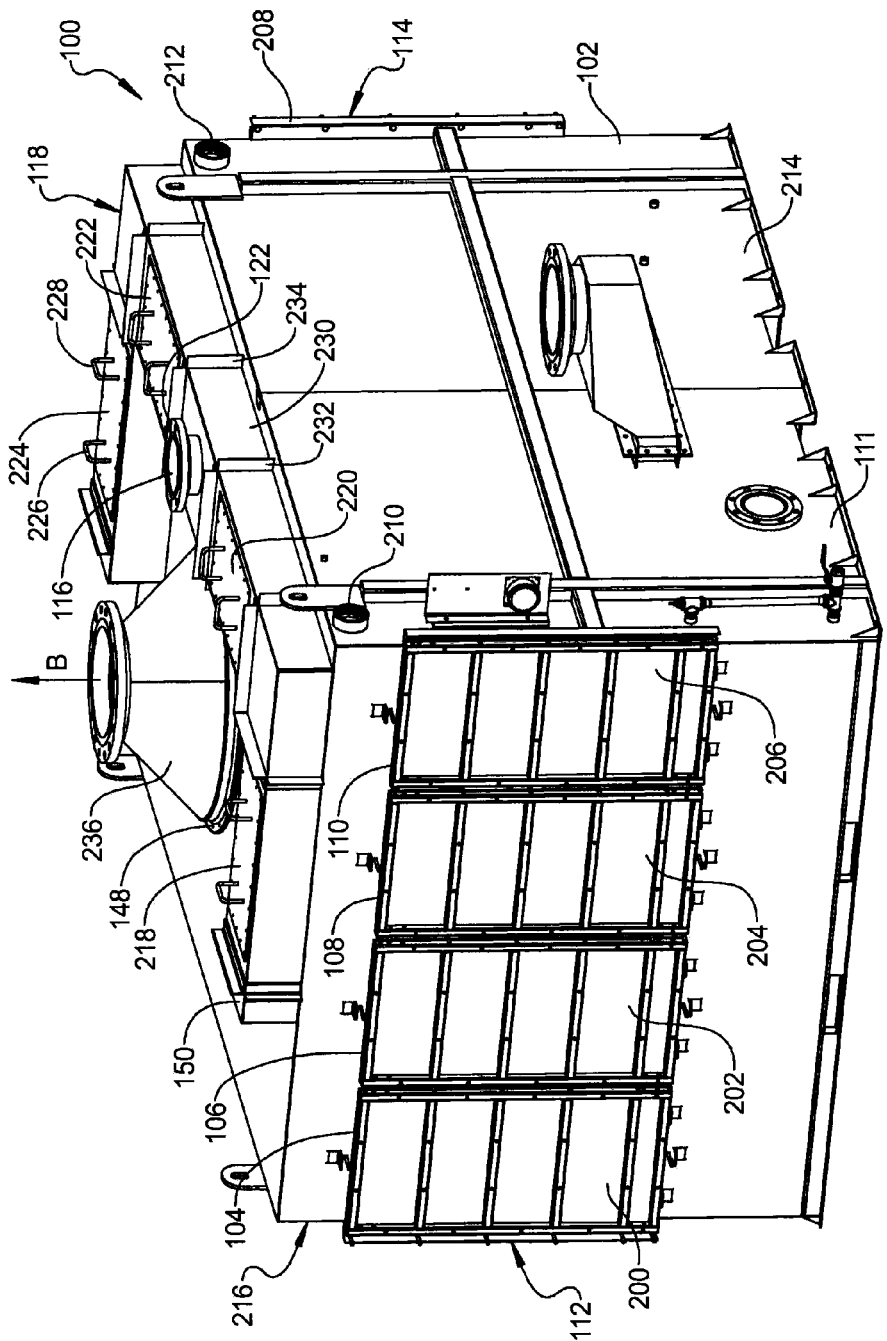
FIG. 6 is a top right perspective view of the VOC removal device of FIG. 2 in a fully assembled condition.

Referring to FIG. 6, a fully sealed configuration of volatile organic compound removal device 100 is created by connection of first, second, third and fourth doors 200, 202, 204, 206 to seal the front access 112 for each of the first, second, third and fourth compartments 104, 106, 108, 110 of front portion 111. A similar set of four doors (having only a fifth door 208 partially visible in this view) are used to seal the rear access 114 for each of first, second, third and fourth compartments 104', 106', 108', 110' of rear portion 113. Because the contaminated water internal flow passages of volatile organic compound removal device 100 are not downwardly pitched to rely on gravity flow and have a limited pressure containment capability, first and second cabinet cleanout ports 210, 212 are provided at the front and rear portions 111, 113 on a first side wall 214 of cabinet 102 which discharge a portion of the contaminated water that exceeds a combined flow capacity of all the downcomer assemblies for collection by a subsystem (not shown) and subsequent return to contaminated fluid inlet 116. Mirror image cabinet cleanout ports 210', 212' (not visible in this view) are provided at the front and rear portions 111, 113 on a second side wall 216 of cabinet 102.

To permit cleaning of flow distribution duct assembly 118 without removal from cabinet 102, individual access panels can be releasably connected to the upper containment wall 150 at multiple locations. These can include but are not limited to first, second, third and fourth access panels 218, 220, 222, 224, each of which can also include first and second handles 226, 228 to assist in moving the access panels. For further ease in both construction and cleaning, flow distribution duct assembly 118 can be divided into multiple sub-sections such as a first sub-section 230 having flange 122 and contaminated fluid inlet 116. Each sub-section can include at least one of a first and/or second end flange 232, 234 which are used to connect successive sub-sections together. A discharge adapter 236 can be connected to contaminated air discharge port 148 to collect air containing VOCs in gaseous form for discharge from volatile organic compound removal device 100 in air flow direction "B".

Volatile organic compound removal devices of the present disclosure offer several advantages. By replacing known flow distribution piping assemblies with a flow distribution duct assembly 118, multiple components, connectors and fasteners are eliminated. Flow distribution duct assembly 118 also occupies a smaller space envelope on the cabinet upper wall, and provides for improved access and reduced disassembly/reassembly time for cleaning. Flow channels of flow distribution duct assembly 118 made by forming sheet metal into channel shapes also simplify fluid delivery to the internal compartments of the cabinet and further substitute flow dividers in place of piping, fittings, joints, and fasteners. The flow distribution duct assembly 118 includes only a single piping connection joint, flange 122, compared to multiple piping connection joints used in known systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. For example, the flow distribution channels are described as being rectangular-shaped; however, other geometric shapes can also be used, such as square, circular, oval, and the like. Metals which are compatible with VOCs are identified for the flow distribution duct assemblies; however, other materials which are compatible with VOCs such as polymeric materials can also be used.

What is claimed is:

1. A fluid inlet and distribution system for a volatile organic removal device, comprising:
a cabinet having a horizontal upper wall and a plurality of downcomer assemblies positioned within the cabinet; and
a flow distribution duct assembly connected to the upper wall of the cabinet, including:
multiple containment walls defining a flow passage;
a contaminated fluid inlet connected to one of the containment walls; and
a discharge duct connected to a bottom one of the containment walls and positioned proximate to the plurality of downcomer assemblies;
the contaminated fluid inlet directing flow of a contaminated fluid having a volatile organic compound into the flow distribution duct for substantially horizontal-only flow to the at least one discharge duct.

2. The fluid inlet and distribution system of claim 1, wherein the flow distribution duct assembly includes mirror image first and second main flow ducts that equally divide the contaminated fluid flow received via the contaminated fluid inlet.

3. The fluid inlet and distribution system of claim 2, wherein the first main flow duct provides flow of the contaminated fluid to a first portion of the plurality of downcomer assemblies positioned within the cabinet and accessible through a cabinet front access, and the second main flow duct provides flow of the contaminated fluid to a second portion of the plurality of downcomer assemblies positioned within the cabinet accessible through a cabinet rear access.

4. The fluid inlet and distribution system of claim 1, further including at least one sealing joint created between abutting ones of an upper, the bottom, an outward facing or an inward facing one of the containment walls to create a fluid seal for the flow passage.

5. The fluid inlet and distribution system of claim 4, wherein a vertical height of the flow distribution duct assembly having the contaminated fluid inlet connected to either the outward or inward facing containment wall is less than a vertical height of the flow distribution duct assembly having the contaminated fluid inlet connected to the upper containment wall.

6. The fluid inlet and distribution system of claim 1, further including at least one cabinet cleanout port provided to access the cabinet for cleaning proximate to the discharge duct.

7. The fluid inlet and distribution system of claim 1, wherein the flow distribution duct assembly is divisible into multiple sub-sections each including at least one end flange used to connect successive ones of the multiple sub-sections.

8. The fluid inlet and distribution system of claim 1, wherein the flow distribution duct assembly is directly connected to the upper wall of the cabinet, the bottom one of the containment walls of the flow passage conforming to a planar, horizontal orientation of the upper cabinet wall and not having an angular or downward pitch and therefore not creating gravity flow of the contaminated fluid toward the discharge duct.

9. A fluid inlet and distribution system for a volatile organic removal device, comprising:
a cabinet having an upper wall and multiple downcomer assemblies positioned within the cabinet accessible through a cabinet access, each of the downcomer assemblies positioned in individual cabinet compartments each isolated from successive ones of the cabinet compartments by a dividing wall; and
a flow distribution duct assembly connected to the upper wall of the cabinet, including:
upper, bottom, outward facing and inward facing containment walls defining a generally rectangular shaped flow passage;
a contaminated fluid inlet connected to one of the upper, inward facing, or outward facing containment walls; and
a discharge duct connected to the bottom containment wall and positioned above a receiving chamber operating to equally divide a flow of a contaminated fluid containing a volatile organic compound discharged through the discharge duct equally to the cabinet compartments.

10. The fluid inlet and distribution system of claim 9, further including a receiving chamber positioned below the discharge duct and receiving the flow of contaminated fluid discharged through the discharge duct.

11. The fluid inlet and distribution system of claim 10, wherein the receiving chamber is partially bounded on opposite sides by first and second receiving chamber dividing walls.

12. The fluid inlet and distribution system of claim 11, wherein the receiving chamber is further defined by a boundary wall which is spaced from end faces of both the first and second receiving chamber dividing walls.

13. The fluid inlet and distribution system of claim 11, wherein the first and second receiving chamber dividing walls extend completely between the cabinet upper wall and a receiving chamber lower wall.

14. The fluid inlet and distribution system of claim 9, wherein the at least one dividing wall permits overflow of the contaminated fluid to reach one of the downcomer assemblies.

15. The fluid inlet and distribution system of claim 9, wherein the flow distribution duct assembly includes only a single piping connection joint.

16. The fluid inlet and distribution system of claim 9, wherein the upper and bottom containment walls of the flow distribution duct assembly are both oriented parallel to the cabinet upper wall.

17. A fluid inlet and distribution system for a volatile organic removal device, comprising:
a cabinet having an upper wall and multiple downcomer assemblies positioned within the cabinet accessible through each of a cabinet front and rear access, the multiple downcomer assemblies divisible into first and second cabinet compartments isolated from each other by a dividing wall, the first and second cabinet compartments duplicated in each of a front portion and a rear portion of the cabinet; and
a flow distribution duct assembly connected to the upper wall of the cabinet; including:
mirror image first and second main flow ducts each having upper, bottom, outward facing and inward facing substantially flat containment walls formed into a rectangular shaped flow passage;
a contaminated fluid inlet connected to one of the upper, inward facing, or outward facing containment walls; and
first and second discharge ducts each connected to the bottom containment wall of one of the first or second main flow ducts, each positioned above a receiving chamber of one of the front and rear portions, each operating to equally divide a flow of a contaminated fluid containing a volatile organic compound discharged equally through the first and second discharge ducts to the first and second cabinet portions.

18. The fluid inlet and distribution system of claim 17, further including first and second receiving chambers each positioned below one of the discharge ducts.

19. The fluid inlet and distribution system of claim 17, wherein each of the receiving chambers is partially bounded on opposite sides by first and second receiving chamber dividing walls and by a boundary wall which is spaced from end faces of both the first and second receiving chamber dividing walls.

20. The fluid inlet and distribution system of claim 17, wherein the first discharge duct is positioned to provide half of the contaminated fluid to the downcomer assemblies of the front portion and the second discharge duct is positioned to provide half of the contaminated fluid to the downcomer assemblies of the rear portion.

* * * * *